United States Patent [19]
Tseng

[11] Patent Number: 5,631,536
[45] Date of Patent: May 20, 1997

[54] RECHARGEABLE BATTERY VENDING APPARATUS

[76] Inventor: Ling-yuan Tseng, 13772 Calle Tacuba, Saratoga, Calif. 95070

[21] Appl. No.: 243,346

[22] Filed: May 16, 1994

[51] Int. Cl.$^6$ .................................................. H01M 10/42
[52] U.S. Cl. ................................................. 320/15; 320/2
[58] Field of Search .................... 320/2, 15; D20/1–9; 364/918.51; 104/34; 414/227

[56] References Cited

U.S. PATENT DOCUMENTS

| | | | |
|---|---|---|---|
| 4,118,661 | 10/1978 | Siekierski et al. | 320/40 |
| 4,299,526 | 11/1981 | Smith | 414/392 |
| 4,334,819 | 6/1982 | Hammerslag | 414/395 |
| 4,450,400 | 5/1984 | Gwyn | 320/2 |
| 4,532,418 | 7/1985 | Meese et al. | 320/2 |
| 4,589,069 | 5/1986 | Endo et al. | 364/405 |
| 4,629,947 | 12/1986 | Hammerslag | 318/161 |
| 4,654,800 | 3/1987 | Hayashi et al. | 364/918.51 |
| 4,700,121 | 10/1987 | Neri | 320/2 |
| 4,866,661 | 9/1989 | De Prins | 364/918.51 |
| 4,983,903 | 1/1991 | Bae et al. | 320/2 |
| 5,091,687 | 2/1992 | Meyer et al. | 320/2 |
| 5,093,557 | 3/1992 | Lok et al. | 219/388 |
| 5,187,423 | 2/1993 | Marton | 320/2 |
| 5,275,525 | 1/1994 | Grumblatt | 414/458 |
| 5,297,664 | 3/1994 | Tseng et al. | 320/22 |
| 5,301,765 | 4/1994 | Swanson | 180/68.5 |
| 5,305,513 | 4/1994 | Lucid et al. | 29/402 |
| 5,349,535 | 9/1994 | Gupta | 320/2 X |

FOREIGN PATENT DOCUMENTS

| | | |
|---|---|---|
| 1-175695 | 7/1989 | Japan . |
| 2-308391 | 12/1990 | Japan . |
| 6-28558 | 2/1994 | Japan . |

*Primary Examiner*—Peter S. Wong
*Assistant Examiner*—K. Shin
*Attorney, Agent, or Firm*—Gifford, Krass, Groh, Sprinkle, Patmore, Anderson & Citkowski

[57] ABSTRACT

A battery recharging apparatus is specifically configured to enable a customer to exchange a discharged or partially discharged battery for a fully charged replacement. Operator-assisted and entirely automatic vending versions are disclosed. In all embodiments, a controller causes a multiple port charger to recharge one or more batteries electrically connected thereto, preferably using a time multiplexing scheme. In the operator-assisted embodiment, an attendant inputs information concerning the customer, the vehicle, or the battery, and accounting-related functions are carried out through an interface to an electric cash register or some other payment-related facility. In the automated alternative of the invention, the apparatus is entirely self-contained within an enclosure including an access panel or window through which a user may deposit a battery in turn for a fully charged unit. Alternatively, the user may simply purchase a new, fully charged battery or battery pack. In this automated version a control panel accepts customer related information such as vehicle number, battery number or license plate number, the control panel further including means to accept a payment, whether in cash or through a reader of a standard credit card or card dedicated to the use of the invention. The vending machine is preferably constructed in modular form such that additional customer access areas may be disposed around the carousel so as to service more than one individual at a time.

25 Claims, 8 Drawing Sheets

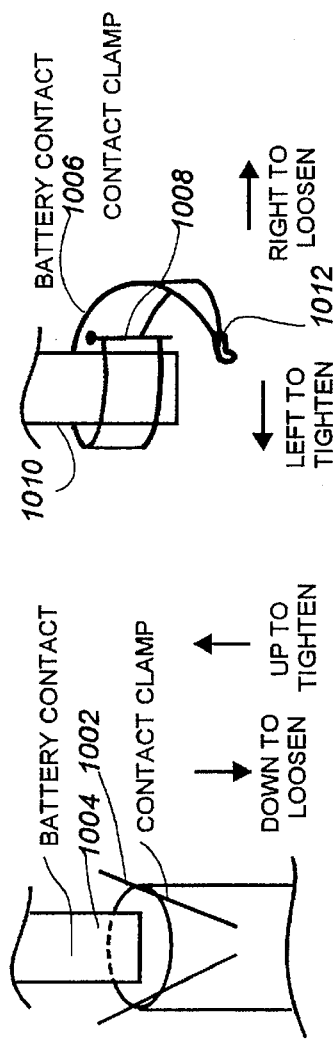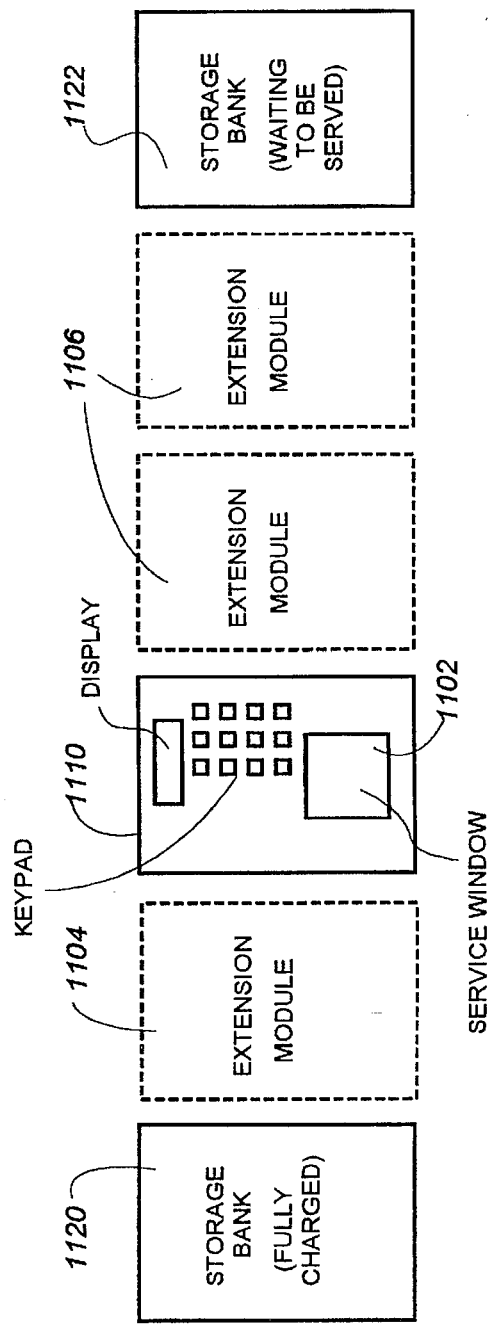

RECHARGEABLE BATTERY VENDING APPARATUS

FIELD OF THE INVENTION

The present invention relates generally to battery charging and, in particular, to a system capable of providing a customer with a recharged or substitute battery, and including a vending machine version of the system which automatically accepts a discharged unit, delivers a fully charged unit, and performs inventory management and communication functions.

BACKGROUND OF THE INVENTION

Electrical vehicles such as motorcycles, motor scooters, and so forth are extremely popular in certain parts of the world, especially in the Far East. Given the traffic congestion in some urban environments, such electric vehicles represents an indispensable way of navigating through traffic. There are also indications that other types of electric vehicles will soon become commercially viable, including electric cars, busses, and so forth. The forces behind this eventual acceptance range from increased demands for environmental protection and reduced road noise, to more efficient energy utilization and highway vehicle integration. Advances in battery technology are also gradually turning the desire for an efficient, affordable electrical automobile with sufficient range into a reality.

At the present time, however, and for the foreseeable future, electric vehicle development faces serious technical challenges, including the fact that present batteries simply do not hold a charge of sufficient magnitude to support a satisfactory range. This presents three possible options. One option is that such electric vehicles will, at least for the time being, be relegated to short-range applications. Another possibility is that the public will simply have to wait until battery technology advances to the point which allows the required extended range. The third possibility mandates that charging facilities of sufficient number are conveniently located so that drivers may advance to such facilities on a point-to-point basis, recharging batteries on an as-needed basis.

Regarding the second option, an enormous number of research and development organizations are investing considerable resources toward the development and perfection of new battery materials exhibiting ever higher energy-to-weight ratios. The hope remains that one day very small, lightweight batteries will be developed which store sufficient energy to allow a driving range comparable to that of a conventional automobile having a full tank of gas. Even if such a battery were to be developed in the near term, however, the need will remain for convenient charging service stations. Although charging technologies are advancing rapidly in concert with battery development, the actual time required to charge a battery will no doubt remain problematic. Fundamentally, this is due to the nature of the battery materials used, the manner in which the battery is discharged, and the chemical and physical characteristics of the battery constituents. Even if lightweight, high storage, fast-charge batteries are developed ahead of schedule, there remains little doubt that the charge time will remain sufficiently prolonged that a vehicle operator will be inconvenienced if forced to wait.

Moreover, it often happens that in the effort to speed the charging process, efficiency suffers. In other words, even if super-fast charging is made available, it may require more electricity for a full charge. Additionally, on-demand charging will often result in the need for energy during peak load hours, which could prove to be more costly. All such factors will tend to limit vehicle battery charging on a demand basis.

An alternative to a charge-while-you-wait approach is to simply swap a discharged battery pack for a fully charged unit. This would allow a customer to walk into a convenience store, service center or gas station, tender a required amount of money, and come away with a fully charged battery pack. Although it may be some time before automotive battery packs are lightweight enough to facilitate such portability, for smaller vehicles such as electric motorcycles, motor scooters, electric golf carts, shopping carts, etc., the associated electrical demands should be modest enough from the outset to favor battery swapping over on-demand charging. Furthermore, to establish numerous charging facilities sufficient to support a large number of vehicle operators, each requiring concurrent charging, could place a heavy burden on the technical requirements of the servicing facility. Such recharging stations might also be too complex for ordinary home operation. It may be that unless a more convenient and straightforward means for battery swapping for electric vehicles is introduced, progress in this area will be unnecessarily hampered.

SUMMARY OF THE INVENTION

The present invention provides apparatus and methods for the rapid exchange of a discharged or partially discharged battery in return for a charged unit. As such, the invention is particularly well suited to battery-powered vehicles as an alternative to approaches which force a customer to wait during the recharging process.

The apparatus preferably includes a plurality of battery recharging ports, each with means for making electrical contact to the terminals of a battery. A multiple-port charger is operative to route power from an input connected to a source of electrical power to at least one battery through an associated charging port. The apparatus includes means for receiving customer information and battery-related information and a memory to store this information. A controller, connected to the multiple port charger, the memory, and the information receiving means is operative to cause the multiple port charger to charge a battery through its associated charging port, store information in the memory relating to batteries received by and provided to customers, and output payment-related information concerning a customer receiving a recharged battery.

In the preferred embodiment the invention takes the form of a rechargeable battery vending machine including an enclosure and a plurality of battery storage positions within the enclosure. An access area including one or more windows on the enclosure enables a user of the machine to deposit a discharged battery and/or to receive a charged battery. A battery handling mechanism within the enclosure is operative to move a battery between the access area and one of the battery storage positions.

The enclosure includes an input to receive electrical power, and electrical battery contacting means to make electrical contact with a battery in a storage position. A multiple port charger routes power from the input to at least one battery in storage through its associated electrical battery contacting means for the purpose of recharging the battery. An operator control area supported on the enclosure includes payment receiving means. A controller connected to the battery handling mechanism, the multiple port charger, and the operator control area keep tracks of batteries in storage, causes a battery in a storage position to be recharged, and delivers a charged battery to a customer through the access area in accordance with a payment received.

A more sophisticated alternative embodiment of the invention is adapted for use in conjunction with batteries encoding identification information, the apparatus being further connectable to a remote monitoring facility through a communications path, the machine further including a port for connection to the remote monitoring facility and a battery security encoder including an interface operative to receive battery-related information from a battery contained within a battery holding position. In this alternative version the controller is operative to perform all of the following functions:

(a) receive customer-related information through the customer control panel, (b) receive battery chargeability information through battery contacting means associated with the multiple-port charger, (c) receive the battery-identification information from the battery security encoder, (d) cause the acceptance of a customer-supplied battery conditioned upon:
information relating to a customer,
battery chargeability, or
battery identification information, (e) cause movement of the battery movement mechanism in order to align a battery holding position with the access area, (f) cause the multiple-port charger to charge a battery in a holding position in accordance with a charging algorithm, and (g) communicate with the remote monitoring facility through the communications path.

In a further alternative embodiment the invention facilitates the exchange of multiple discharged or partially discharged modules in return for a set of recharged units. In the case of such multiple module or battery swapping, the electrical characteristics of each battery received may be tested and optionally compared against historical data associated with each battery so as to derive a charging pattern for the new batteries, and/or electrical characteristics associated with the replacement batteries, which offers the most compatibility in terms of electrical requirements such as discharge profile.

BRIEF DESCRIPTION OF THE DRAWINGS

FIG. 10A illustrates one way in which a contact clamp may engage with a battery contact for the purpose of recharging;

FIG. 10B shows an alternative contacting method to that of FIG. 10A;

FIG. 11 is a drawing of a possible customer interface including expansion modules.

DETAILED DESCRIPTION OF THE PREFERRED EMBODIMENTS

The present invention provides an rechargeable battery vending apparatus and methods which facilitate an efficient, convenient, cost-effective and safe system for recharging batteries. The invention is particularly well suited to batteries associated with electrically powered vehicles. In metropolitan areas, battery recharging centers utilizing the teachings of this invention may be conveniently located in stores and service centers, where vehicle operators may gain easy access. For example, one such installation will be responsible for a particular geographic area, though the number of such centers may be increased in accordance with traffic patterns.

In the preferred embodiment the invention takes the form of an automated rechargeable battery vending machine. However, many of the subsystems involved find utility apart from a fully automatic apparatus and will be described with that in mind. Also, the invention may work with rechargeable batteries in many forms so the terms "battery" and "battery pack" are equally appropriate.

Figure 1:
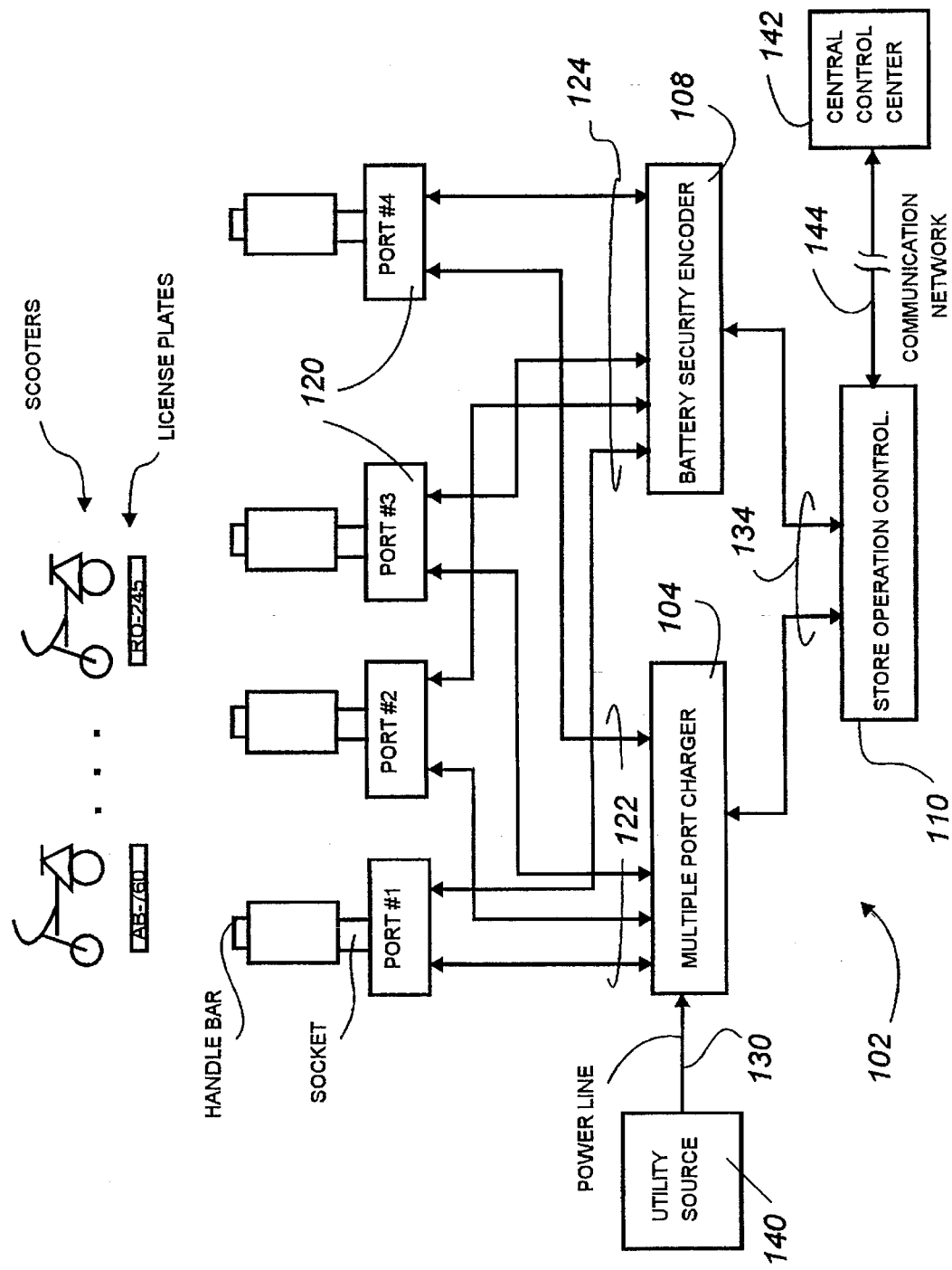
FIG. 1 is a simplified block diagram of a multiplexed battery charging system applicable to a battery swapping application.

FIG. 1 is a simplified block diagram which presents an overview of certain electrical aspects of the invention which would be provided in a typical installation. Generally speaking, the apparatus 102 includes a multiple-port charger (MPC) 104 interfaced to charging ports 120, a battery security encoder (BSE) 108 and a station operation controller (SOC) 110. Each charging port 120 has associated with it power cables 122 connected to the MPC and data signal lines 124 connected to the BSE. Power is provided to the MPC through cables 130 which interface to a source of power.

Depending upon the location of the center, the power available from the utility might vary. For example, if located proximate to a busy business district, the available power might be limited, for instance, to low voltage services. On the other hand, if power distribution is less critical, the utility may be capable of providing higher voltage services to the center. The present invention will preferably accommodate all such situations, regardless of the local power level made available by the utility.

As shown in the Figure, both the MPC 104 and the BSE 108 are in communication via paths 134 with the SOC, which performs multiple functions within the installation. These functions, many of which are optional, include the monitoring of charging operations in progress, physical control of the charging being carried out at each port, inventory control, cost optimization, accounting, billing and collecting, monitoring with regard to safety considerations, reporting to law enforcement agencies, communication with a remotely located company control center 142 over network 144, and various other operations.

The following discussion concerns the servicing of an electrically powered motor scooter, though it should be understood that the invention is by no means limited to such an application, and is equally applicable to any and all other types of electrically powered vehicles. Also this discussion is limited to a non-automated version of the invention, though applications of the automated preferred embodiment discussed below is also available as an alternative. Realizing that the scooter is running on reserve electrical power, the operator will pull into a store or station equipped with the present invention apparatus, remove the drained battery pack, and bring it to an attendant. As these battery packs may weigh about 10 kilograms, it may be difficult for some individuals to remove the battery pack so that at better service stations the attendant will remove the discharge unit.

In any event, the service station attendant may also key the license plate number into the SOC 110 as a way of initiating the swapping transaction. As an alternative to the license plate number, any form of identification may be used such as driver's license number, vehicle ID number, and so forth. The use of some form of identification enables the discharged and replacement batteries to be traced, thereby preventing unauthorized use of a particular battery and the system in general. The attendant typically further inputs data associated with the discharged and replacement battery packs. Such data may be input in various ways, including manual keying on a keyboard, or through the scanning of a bar code or any other type of permanent identification indicia associated with a battery pack. The attendant then locates a charged unit, either by removing it from a charging port or storage rack, and place the discharged unit into an open charging port of on a storage rack to await recharging.

At this point, the SOC 110 has access to the recharged battery information, the old battery information, and information about the vehicle. Communications will then be initiated between the facility and company control center 142. The history of each battery and whereabouts will be closely monitored via database arrangement to ensure that all units are appropriately traced and maintained. Once the discharged battery pack is in place, the MPC 104 will start the charging operation under the control of the SOC 110.

Figure 2:
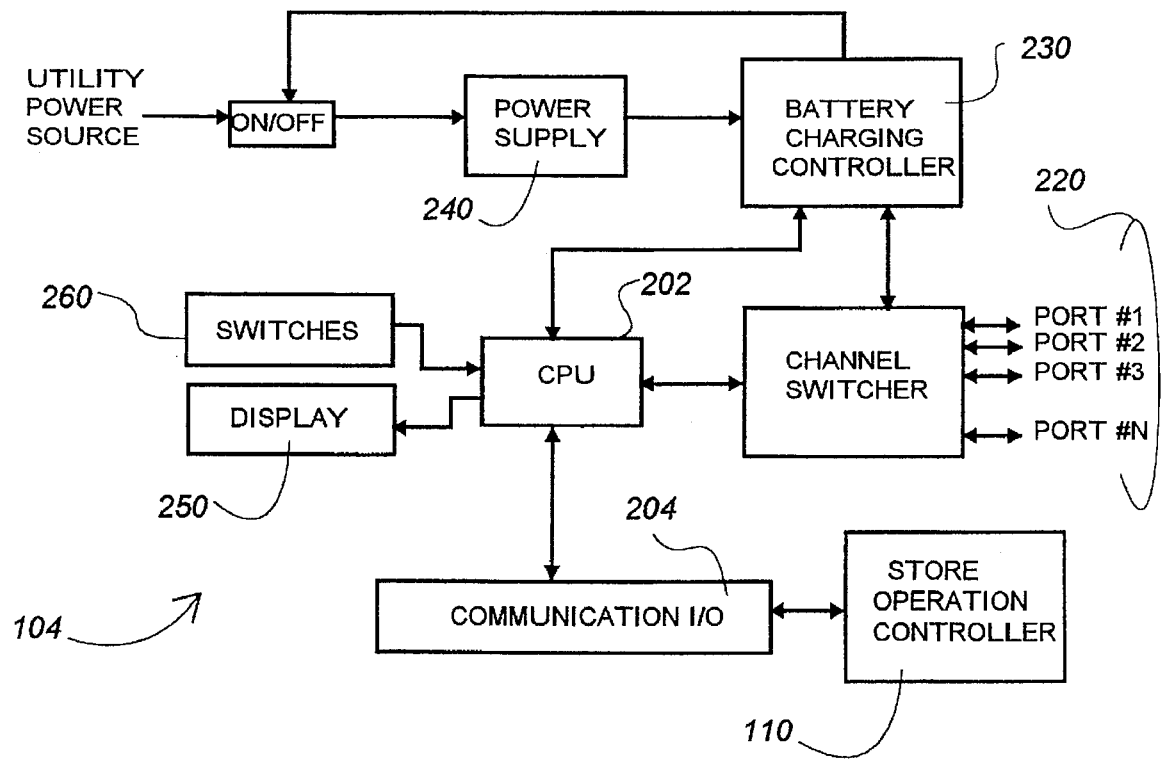
FIG. 2 is a simplified block diagram of a multiple port charger subsystem forming part of the apparatus of FIG. 1.

FIG. 2 shows a simplified functional block diagram of the MPC 104. A CPU 202, preferably in the form of a commercially available microprocessor or microcomputer, is used to coordinate overall operations. A communication module coordinates and controls communications between the CPU and the SOC 110. A channel switcher module 210 controls the power distribution associated with all active charging ports 220. A battery charging controller 230 provides the needed power to the power switcher 210, with a power supply 240 receiving input power from the utility and converting it to meet the desired specifications. A display module 250 provides the necessary information associated with system operation, and the switches 260 enable the station attendant to manually input commands to control the overall operation. As an alternative to separate switches 260 and display 250, the MPC may use the SOC interface shown in FIG. 5.

The charging algorithm preferably makes use of time division multiplexing, whereby during a particular designated time slot only one out of the end charging ports will be activated. During this activation period, the charging port connected will be in communication with the power distribution channel from the MPC. This charging algorithm associated with an individual battery pack in the charging port will be carried out in accordance with parameters provided through the SOC. Such parameters might include, for example, current expressed in amperes, voltage, temperature and time.

Assuming that the allotted power is fixed at a maximum level, the use of this time division multiplexing arrangement will allow multiple batteries to be charged while keeping the total power consumed below the fixed maximum. Thus, using such a multiplexing arrangement, each service station will be able to take on as many charging ports as business permits, including a mixture of "normal" and "fast" charging patterns, with the multiplexing scheme ensuring that maximum power consumption is not exceeded. Moreover, in many instances, battery charging in the form of short pulses as opposed to continuous current improves charging efficiency. Therefore, this type of time division multiplexing should not only allow multiple batteries to be recharged simultaneously, but should allow each battery to be recharged in a highly effective manner.

Figure 3:
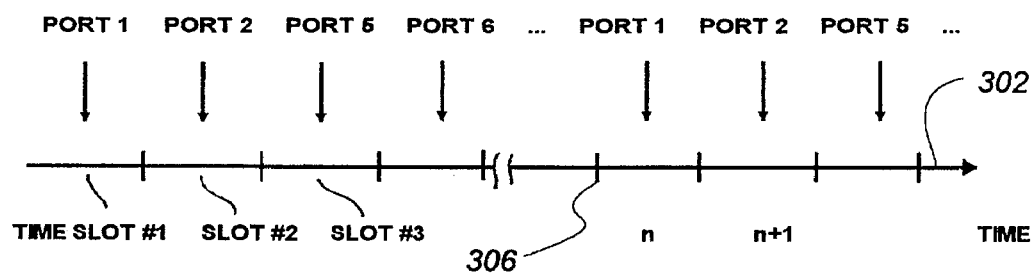
FIG. 3 is a schematic time line used to indicate how multiple batteries may be charged in accordance with time-division multiplexing.

FIG. 3 should help to illustrate the time division charging cycle through the use of timeline 302. Along this time line are various segments and, within each segment, a particular charging port P number N is assigned a time slot T number N during which energy will be delivered to this port either as a continuous current, single pulse or multiple pulses, depending upon technical requirements. For example, the charge pattern may be determined in accordance with a charging algorithm chosen to maximize or optimize throughput. As shown in FIG. 3, during a first time period 6 ports are powered, on sequential basis, until time 306 is reached, at which point the process starts over with port 1. The number of ports is variable, as is the amount of time allocated to a particular port. Also, the use of single pulses and multiple pulses may be varied in accordance with the time allotted or the battery type connected to a particular port. Typically, the more charging ports in operation, implies that more batteries will be in need of a recharge, and more charging time will be required for each battery to become fully charged. In the event that the inventory of fully charged batteries is running low or a great number of customers are waiting for replacement batteries, the SOC may manually or automatically enter a fast-charge mode of operation, which, for example, will allow a subset of the total number of batteries connected to the ports to be charged during a shorter period, depending upon the circumstances. Again, such a charging algorithm, even if tailored to unique circumstances, may be determined by the SOC.

Figure 4:
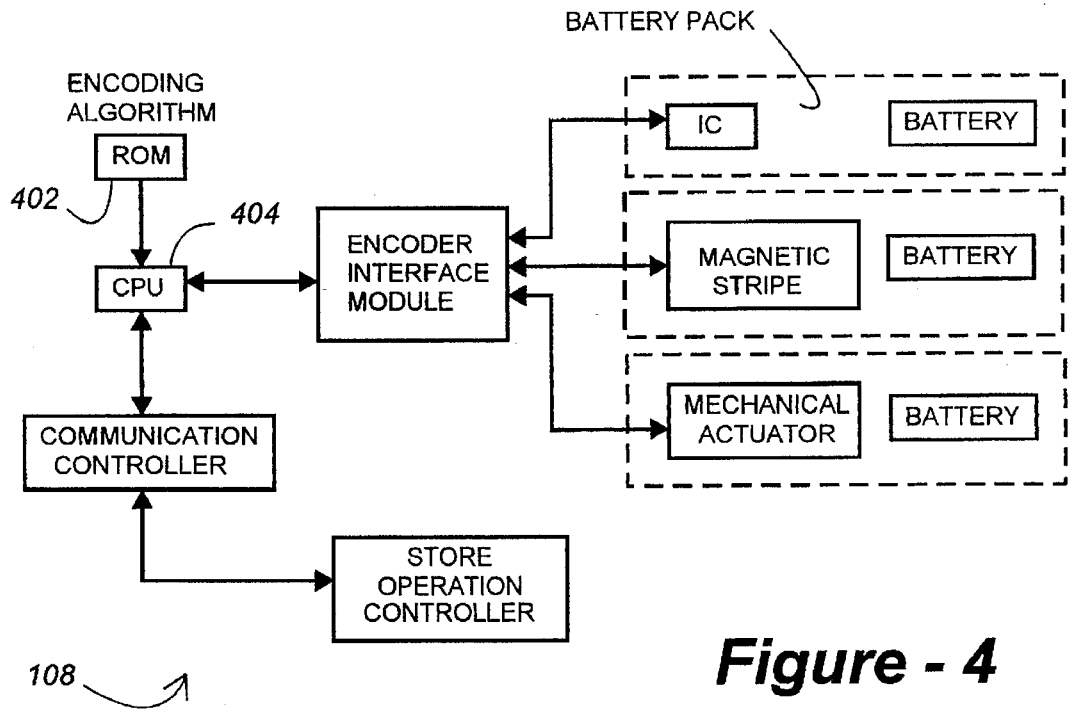
FIG. 4 is a simplified block diagram of battery security encoder electronics used to ensure that batteries are swapped and accounted for properly.

FIG. 4 provides a functional block diagram of the battery security encoder or BSE 108, the primary function of which is to encode and match operator or vehicle identification information with that of a battery pack. More specific functions of the BSE will be explained as follows. First, a customer's scooter or vehicle license plate number is entered into the BSE, either by a store attendant or perhaps through more automated approaches taking advantage of computer-readable information. Using an encoding algorithm, contained in memory 402, a different number will be generated by the CPU 404 of the BSE which in turn will be attached to the recharged battery pack delivered to the customer.

In the preferred embodiment, this new battery pack number will be detected by on-board power control circuitry integrated into the scooter when the battery is properly seated in position. Only in the event that the battery security code is properly decoded by the on-board decoder will the scooter power system function. If an incorrect code is found, the power system will be rendered inoperative. Since the fully charged battery pack may become an attractive target for theft, the use of such a security encoding system may be implemented to deter criminal activity. Security of the battery pack is particularly important in places where scooters are used as main transportation vehicles, since even petty thieves may want to steal a fully charged battery pack simply to continue traveling and not necessarily for resale. Even though the vehicle ID number or license plate number used for correlation purposes may be visible to anyone, it is expected that the serial number attached to a newly charged battery pack will be obscured once installed and only readable by the store attendant. As such, an object of the security system is to protect both the customers using the invention and the participating service company.

Figure 5:
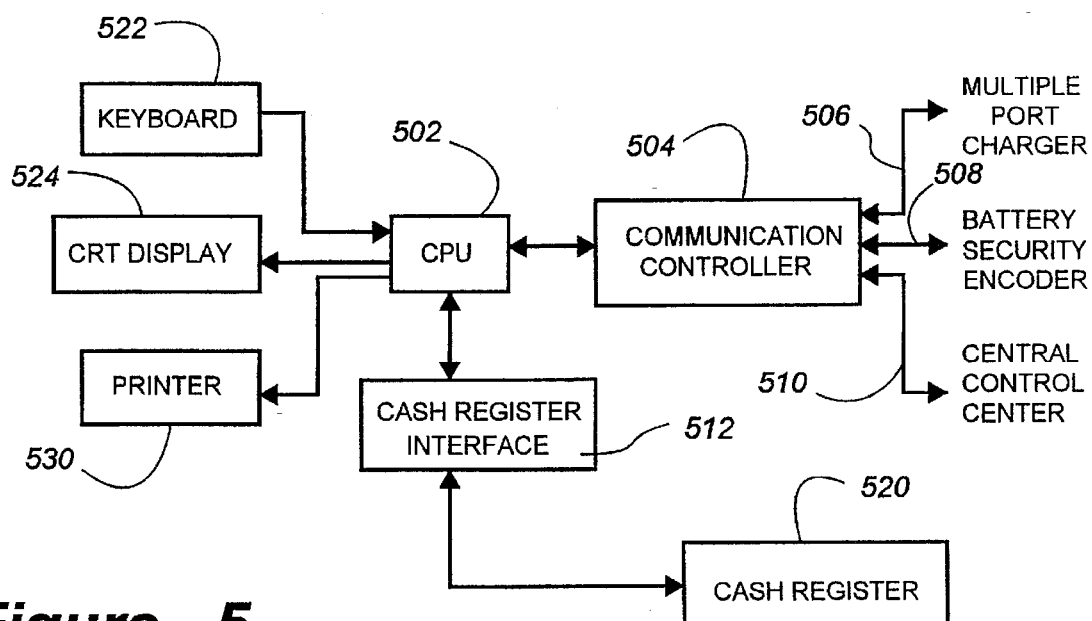
FIG. 5 is a simplified block diagram of an operation controller capable of coordinating the overall functioning of the apparatus introduced with respect to FIG. 1.

FIG. 5 provides a simplified block diagram of a store operation controller or SOC, which handles administrative functions associated with the system. A central processing unit 502 interfaces to a communications controller 504 which, in turn, communicates with the MPC along line 506, the BSE along line 508, and the central control center along line 510. The CPU also interfaces to a cash register interface 512 in further communication with the cash register itself 520. A user interface is further provided consisting of keyboard 522, CRT display 524, and printer 530. Although FIG. 5 shows a typical configuration, various aspects may be altered, added or removed, depending upon the particular circumstances. Typically, the SOC will monitor and record each transaction, including a record of each battery's charging cost. This aspect of the system will further monitor the battery security status so as to assist law enforcement agencies in monitoring vehicle movement, and so forth. The SOC may also handle inventory control, production control, accounting, billing, collection, and other payment-related functions.

As a further alternative capability of the present invention, multiple batteries may be grouped in accordance with compatible electrical characteristics so as to optimize charge and discharge cycles. This is an important consideration in the event that a particular vehicle uses more than one battery or module, in which case it is desirable to match electrical parameters such as discharge pattern among such modules for the highest level of conformity. It is advantageous that individual modules have the same discharge curve to limit internal selfcharging and energy offset problems to ensure maximum operating efficiency.

One reason why multiple modules may be used instead of a single module might be to minimize the weight of a given module, thereby facilitating more convenient carrying. This may lead to problems as well, however, since if customers carry battery packs to and from their homes or businesses to a recharging station, if the recharging conditions are not tightly controlled, battery life will be shortened and the power performance of the vehicle may be jeopardized during subsequent use.

Therefore, as an additional alternative feature of the present invention, capabilities may be added to track the electrical characteristics of each battery, including the accessing of a historic profile for a battery from a central database. This information may then be used in conjunction with information derived from the electrical circuitry associated with the recharging port or ports. Based upon this and possibly other information, should a customer request the exchange of multiple modules, the system will group the most compatible modules and attempt to accommodate the requirement.

Specifically, the SOC may be used to further keep track of the electrical characteristics associated with each battery, including its discharge pattern. In the event that the SOC is in communication with a database of battery information, the historical data associated with a particular battery or set of batteries may be used in conjunction with, or to modify, the charging pattern of a set of batteries received by a customer or supply to a customer a set of batteries with a particular, desirable discharge pattern.

Figure 6:
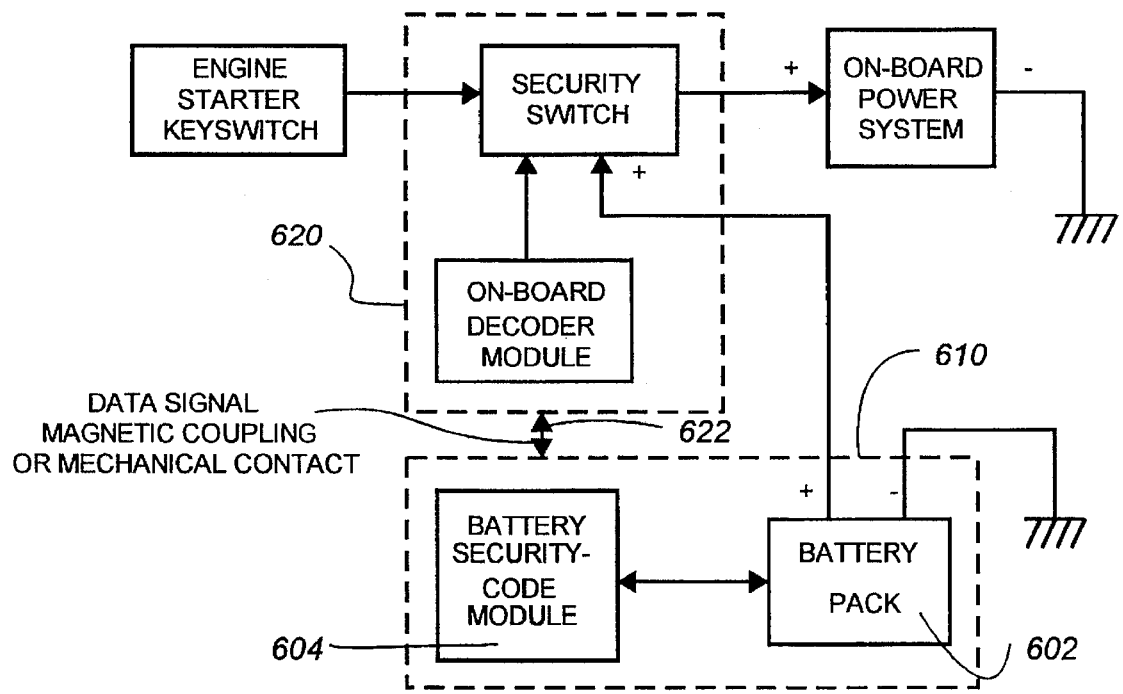
FIG. 6 is a simplified block diagram of a power security system adaptable to installation within the electric vehicle.

FIG. 6 shows a simplified block diagram of the power security system preferably installed on-board those scooters or vehicles intending to take advantage of the present invention. The battery pack 602 contains a unique security code which is attached to the pack but not visible to other scooter operators. For example, the security code may be in electronic form in computer-readable form or as an integrated circuit with externally accessible contacts. Alternatively, the security code may be in magnetically readable form or in mechanical form such as through the use of a key, only certain of which will unlock a mechanism and allow ordinary use. Regardless of the alternative implemented, block 604 represents the battery's security encoding function, with battery pack 602 and module 604 forming a secure interchangeable unit represented by broken line 610.

On the scooter, there is an on-board module 620 which decodes the batter security code, again, either electrically, magnetically or mechanically, as indicated by the wide arrow 622. The vehicle will function normally if the security code is correct, but if the decoded information is incorrect or unreadable, some means will be used to render the vehicle inoperative, such as the deactivation of the ignition system. Additionally, the system may be configured so as to sound an alarm or siren, including the vehicle's own horn, so as to alert individuals nearby that an unauthorized person is attempting to tamper with the vehicle.

Figure 7:
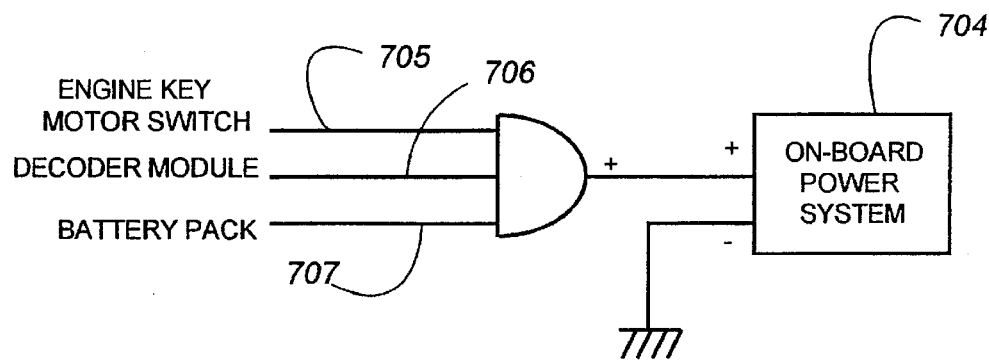
FIG. 7 is a logic diagram used to show inputs which must be present before the on-board power system of FIG. 6 is activated.

FIG. 7 is a logic diagram showing those inputs which must be present in order for the on-board power system to be made functional. Although the diagram shows an AND gate 702 being connected directly to on-board power system 704, in a practical implementation, additional gates or circuitry may be involved. The use of an AND gate 702 is used more to show the logical functioning as opposed to an exact circuit configuration. When all three inputs to AND gate 702 are asserted or represent a logical one, the output of the end gate will go high, thereby enabling the on-board power system. Specifically, the three inputs to the AND gate include the starting switch for the vehicle brought to the AND gate along lines 705, a signal from the decoder module along line 706, and a positive signal from the battery pack along line 707.

The subsystems just described concern an implementation of the present invention requiring attendant intervention, however, in the preferred embodiment, the various components, apart from those associated with the on-board vehicle subsystem, may preferably be configured within a single enclosure to allow for an entirely automated rechargeable battery vending machine application.

Integration of the battery charging facilities and related mechanisms into a fully automated vending machine results in significant advantages in terms of reduced labor cost, potentially lower space requirements, and other forms of overhead. An operator free installation can remain open 24 hours a day, 365 days a year, and may be located just about anywhere for a high degree of convenience. It is believed that the type of convenient battery purchasing, charging and swapping made possible by the automated version of the present invention is a key requisite to the successfully realization of a thriving electrical vehicle industry.

The following illustrations and accompanying text address this automated version of the invention. Broadly, an automated installation will include an operator interface resembling those associated with automatic teller machines or ATM terminals, except that the system according to the present invention includes numerous other features relating to battery charging, swapping, vending, and so forth. For example, the system will preferably accept a discharged battery pack at a low energy level, and replace it with a fully charged, reusable unit. Means will be provided whereby the vehicle operator may place the discharged battery pack into a receptacle or vacant charger slot, and the machine will automatically display a credit associated with the energy remaining in the battery, this being an important feature in the event that the used pack is not fully discharged. When a fully charged battery pack is subsequently removed from the unit, the energy remaining on the battery pack which was swapped will be taken into account when figuring the final cost.

In the case of an automated implementation, the security features described above will now typically be keyed in by the vehicle operator as opposed to a service station attendant, including the vehicle or scooter license plate number, battery pack serial number, driver's license number, and so forth, or use a magnetically encoded credit card input. In alternative embodiments, the machine will be capable of displaying different energy prices at different times of the day, so as to reflect savings possible during off-peak hours, and so forth. Such a feature will encourage a user to save money by replacing a battery pack at times of low power load. Also in the automated version of the invention, the store operation controller or SOC will further include an interface module to the operator control subsystem to handle all payments, whether by credit card, bank card, coin, paper money, and so forth. The system will enable a user to purchase a fully charged battery in addition to swapping a discharged unit for a fully charged unit. Accordingly, in the event that the inventory of available charged battery packs is running low, the machine will further automatically signal a company control center to notify somebody about the situation.

When accepting a discharged battery, the invention will check the functioning of the battery to ensure that it is capable of being recharged. In the preferred embodiment, the system will automatically perform a battery parameter analysis algorithm and, if the condition of the old battery is not acceptable, the machine will display a message to inform the customer. In this case the customer will either have to pay the full amount of money to receive a fresh, fully charged unit or visit a service station for a suitable replacement.

Within the automatic vending machine version of the invention, some form of mechanical battery movement apparatus will be included to transfer the discharged and/or fully charged battery packs, and to perform the necessary recharging operations. Any pertinent data, including the costs and profits associated with recharging, may be made available to remote control center through a variety of possible communication interfaces.

Figure 8:
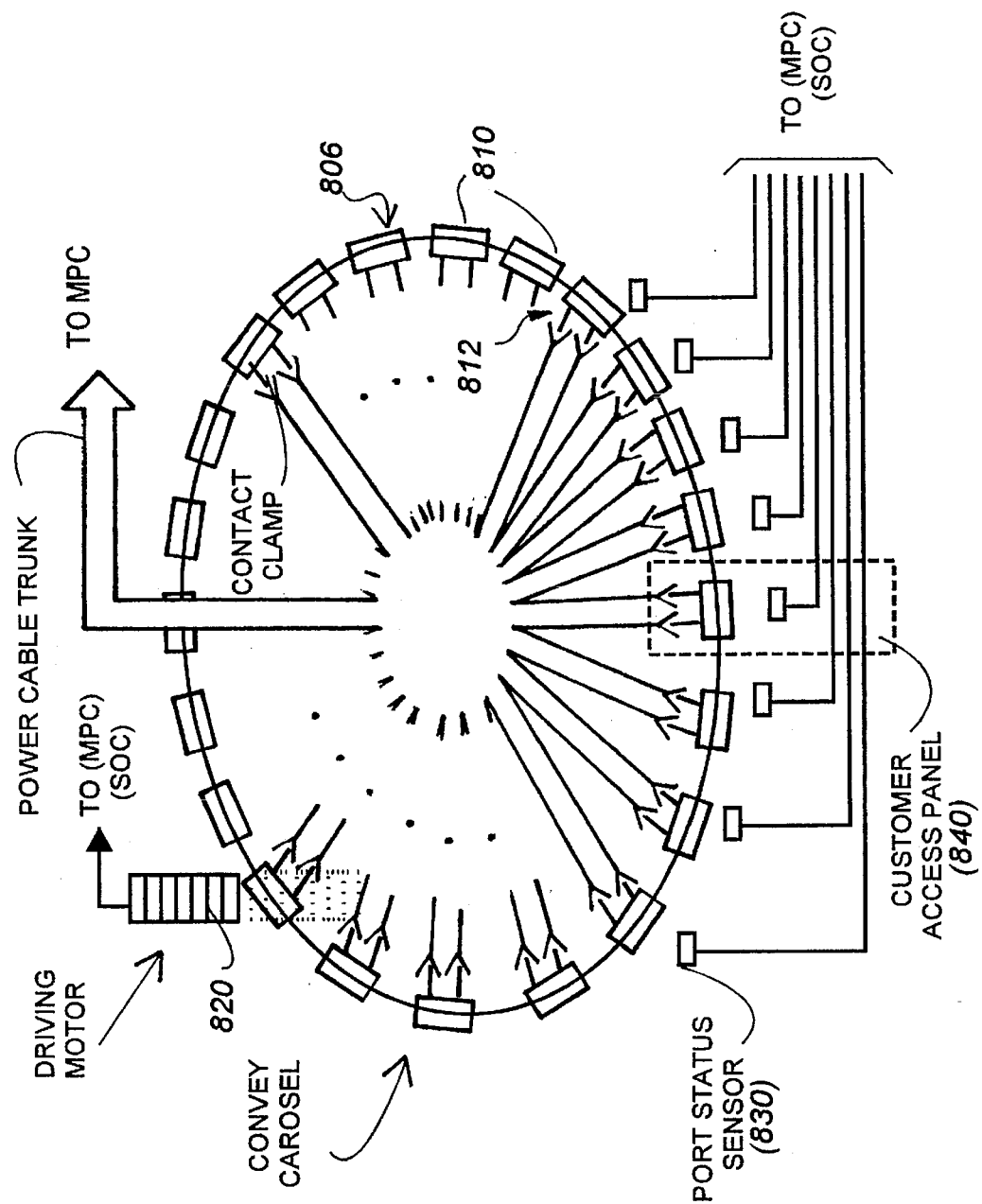
FIG. 8 is an oblique drawing of a mechanism which may be used to position batteries in an automated battery vending machine apparatus.

FIG. 8 illustrates one possible battery movement mechanism in the form of a carousel 806, though other mechanical configurations such as conveyor systems are also possible. The carousel 806 includes multiple battery holding positions 810, each equipped with electrical battery contacting means 812, which enable contact to be made to each battery being held regardless of its position on the carousel. In this way, after a customer deposits a battery, electrical contact can be made to the batteries remaining in inventory for the purposes of testing, recharging and so forth. Movement of the carousel is made possible by the SOC, store operation controller through motor 820.

To increase capacity multiple carousels may be stacked, preferably about a central vertical axis.

A status sensor 830 will preferably be used to determine whether, in fact, a battery is present at a particular holding location. This sensor may be integrated into the contact clamp associated with that holding position or, alternatively, other sensing means may be used such as optical sensing, the weight of the battery, and so forth. Information relating to a battery, once held at a particular position, will be recorded, monitored and controlled by the SOC. During the entire life cycle of a battery contained within the machine, the SOC will keep track of various data, including the location of a particular battery in the carousel, its charging status, and so forth.

Alternative techniques may be used to bring about and/or maintain electrical contact to batteries held within the mechanism. For example, in one case, the contacts may be dedicated to a particular position and move with the battery around the carousel. In an alternative embodiment, however, a separate stationary contacting apparatus may be used which is forced down to the battery beneath it, but only once the carousel, conveyor or other mechanism stops moving. In this embodiment, the contacting clamps will be in electrical communication with different batteries at different times, but by virtue of the intelligence contained within the store operation controller, such variations may be easily monitored and stored so as to avoid operational errors.

Regardless of the contact clamp apparatus utilized, the cabling and forces will be such that little resistance will be presented during the charging process, thereby ensuring a highly efficient process. Once the contact clamps are in position, the multiple port charger or MPC described earlier will be used to resume the charging process based upon the charging pattern associated with a particular battery pack. Again, the versatility of the store operation controller driving the multiple port charger, will make certain that the right algorithm is used in conjunction with the correct battery pack.

An access panel 840 having one or more windows 840 provided on the enclosure for the automatic version of the machine, allowing customers to insert a discharged unit into the system and/or receive a charged unit. Typically, this will be done after the entry of relevant information such as vehicle number, battery pack serial number, and so forth, as explained earlier. Once a discharged unit is placed into the holding position or slot associated with the handling mechanism, the SOC will cause the contact clamps associated with that position to engage so as to perform a functional check. If the inserted battery is in a rechargeable condition, the system will proceed to the next process. If, on the other hand, the battery is found to be defective, it will be rejected and display a message related thereto. In the event that the customer does not wish to exchange a discharged unit for a charged unit but instead wishes to purchase a new pack, other information may be required.

Figure 9:
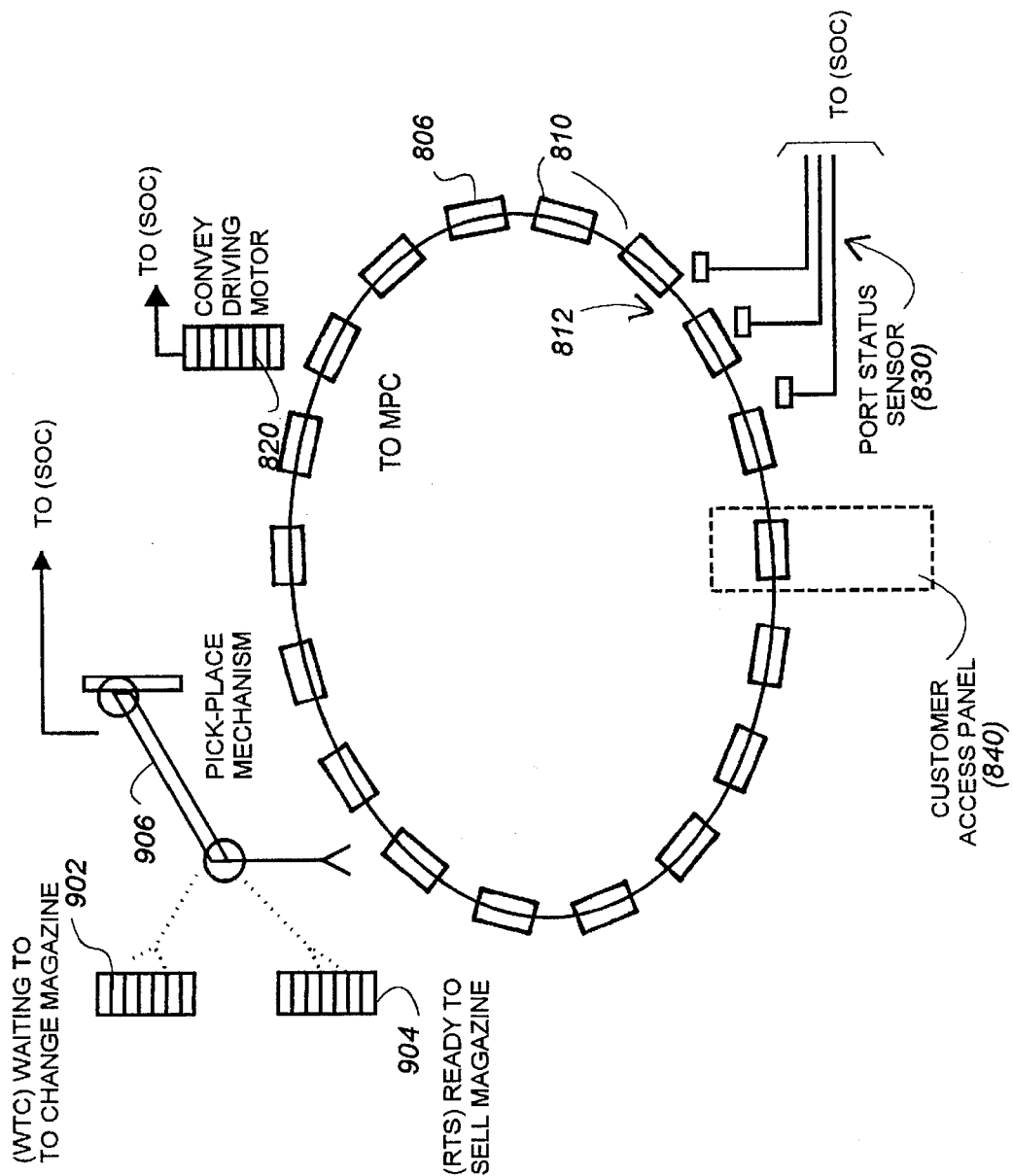
FIG. 9 is a more sophisticated version of the apparatus of FIG. 8, including a robotic pick-and-place mechanism.

FIG. 9 illustrates a more sophisticated alternative embodiment of the automatic vending machine version of the present invention. In this embodiment, there are magazines used to house batteries in different stages, for example, a magazine 902 used to store batteries just received from customers and waiting to be recharged, and a magazine 904 used to store batteries which have been fully charged.

Although these magazines are shown to be separate units, with appropriate intelligence, a single storage facility may be used, with the system automatically keeping track of which types of batteries are stored in various locations. A robotic arm 906, or any alternative pick-and-place type of mechanism is used to transfer batteries into and out of the magazines onto a carousel 908, though again a conveyor or other means capable of transferring the units to and from a customer may alternatively be utilized. In the embodiment shown in FIG. 9, a carousel 908 rotates for alignment with a customer access window 910.

The use of storage magazines is especially useful when an unbalanced demand is encountered, for example during a situation in which a sudden increase in customers exceeds the capacity of the carousel, in which case the use of one or more magazines allows an inventory of fully charged units to be drawn from as buffers in the event that the demand on the carousel itself is suddenly excessive. However, the use of the magazine approach does not preclude the carousel idea and in fact, for certain applications, the two approaches may be used in a complementary fashion. Moreover, while battery packs may be charged in the carousel, the use of a magazine to store discharged units just received from customers, allows charging to take place while in the magazine, thus supporting the idea introduced earlier of having a single magazine house batteries with a range of charge levels, using the system intelligence to keep track of which units are in particular locations.

As mentioned, once a customer places a discharged battery into the holding position within the machine, some form of contact clamps are used to make electrical connection to the battery unit. FIGS. 10a and 10b illustrate two alternative mechanisms for performing this contacting operation, these techniques being preferred as they are low in resistance, though other forms of contacting may be equally applicable. In FIG. 10a, the contact clamp 1002 includes a conical interior structure which, when urged axially against the battery contact 1004 creates a large contacting surface area therebetween, resulting a low-resistance contact. The alternative in FIG. 10b illustrates a contact clamp 1006 in the form of a strap having a first end 1008 fixed relative to the battery contact 1010 and a second end 1012 which may be pulled, causing the strap 1006 to tighten around the contact 1010 and loosened so that the battery contact may be removed. Although this embodiment is somewhat more complicated than that shown in FIG. 10a, it does present the advantage of a potentially lower resistance contact clamp, since a large amount of surface area between the strap 1006 and the contact 1010 will be realized when the strap 1006 is pulled tightly, such as toward the left in FIG. 10b.

FIG. 11 illustrates a possible customer interface useful in the automated version of the invention. Typically the customer will insert a discharged battery into the service window 1102, and contact will be made to the battery, for example, in a manner previously described within reference to FIGS. 10a and 10b. Once contact is made to the battery information will be collected and sent to the multiple port charger and store operation controller. This information will preferably include the type, model, and manufacturer of this particular battery; the electrical status of the battery; the charging history of the battery; and the most optimized charging algorithm for this particular unit. Some of this information may be interpreted from data entered by the customer, such as the battery serial number. Other information may come from data collected through procedures activated by the MPC, through feedback from the regional or central database via the SOC, as well as data generated from within the system.

As shown in FIG. 11, the automated battery vending machine may be modular in construction, having a central portion including a customer access window 1102. The battery movement mechanism and its accompanying drive mechanism, communication modules and so forth may also be provided in modular form to simplify construction and maintenance. In this way, if a higher capacity is desired based upon demand, extension modules 1104 and 1106 may more easily be added. These extension modules are preferably similar to the basic module depicted at 1110, thereby providing more access panels in physical relationship with the carousel or other battery transfer mechanism. Additionally, storage magazines 1120 and 1122 may be added to provide for more fully charged units and units waiting to be recharged, respectively.

Given the flexibility anticipated by the invention, the SOC will further be capable of determining when the recharge of a battery in stock will be most economic. For example, if service traffic is not very heavy and there are fully charged units remaining in storage, the SOC might decide not to perform charging operations on newly received units but rather, to wait until off hours when electricity rates may be more economical. Again, such a feature may be most useful in areas where the service pattern exhibits peak periods of activity and where the difference between day and night utility rates are most significant.

Figure 12:
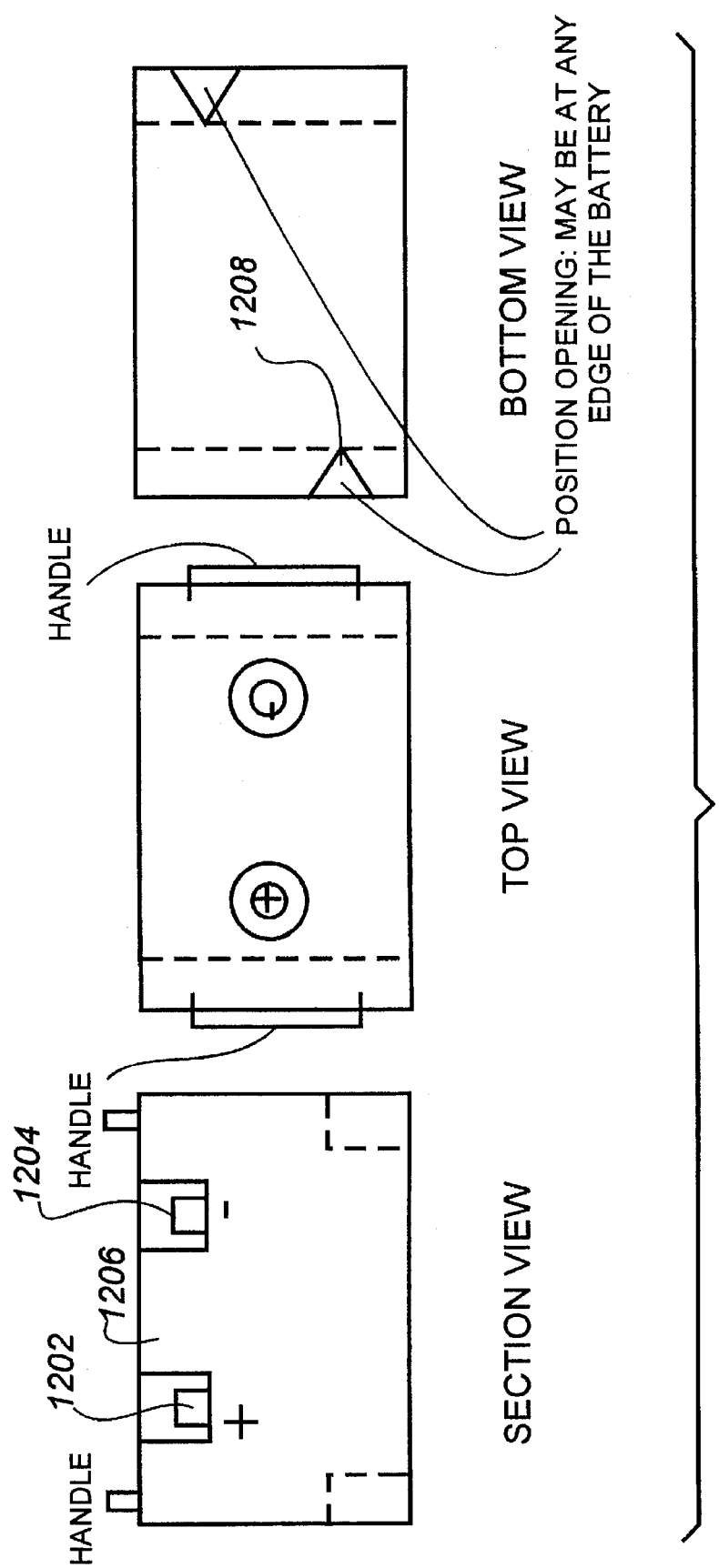
FIG. 12 illustrates an alternative battery design more conducive to automated handling.

Although the present invention may be configured to accommodate batteries and battery packs of varying configuration, specially designed batteries may be provided, as shown in FIG. 12, which might be more conducive to automated handling. In contrast to a conventional battery which includes raised terminals, an improved design, as shown in the sectioned view of FIG. 11, arranges the contact holes 1202 and 1204 beneath the battery top surface 1206. There are several advantages to this configuration, first, in terms of handling, such batteries may be stacked on top of one another without storage and balance problems. Such batteries may save space in a limited area, such as the magazines previously described with reference to the vending apparatus of this invention, and, once stacked, electrical shorting will further be avoided. Additionally, it should be easier with a battery according to the design in FIG. 12 to insert a plug-in socket onto the electrodes 1202 and 1204, resulting in a force which makes a tighter contact to these poles, thus affording a more efficient electrical connection.

As shown in the bottom view of the battery in FIG. 12 openings 1206 and 1208 may be provided so that once a battery is placed into a particular position or slot within the vending machine, automatic alignment will be much more straightforward. It should be noted that these openings need not be on the bottom of the battery, but may be located on the top, sides or any combination between these surfaces so long as the vending machine anticipates their existence and location. The position of the openings may also serve for identification purposes for a special group of customers or batteries. For example, customers associated with special groups such as the post office, utility companies, the telephone provider or community service may automatically receive a reduced rate based solely upon the type or position of the slots or openings associated with these specially designed batteries.

Having thus described my invention, I claim:

1. An apparatus for recharging and dispensing batteries, comprising:

means for physically receiving one or more rechargeable batteries from one or more customers in electrically unconnected form;

a plurality of battery recharging ports, each including means for making electrical contact to the terminals of one of the batteries received;

an input to receive electrical power;

a multiple port charger operative to route power from the input to at least one of the batteries through an associated charging port;

means to receive customer information and battery-related information;

a memory to store the customer information and battery-related information;

a controller connected to the multiple port charger, the memory, and the means to receive customer and battery-identification information, the controller being operative to perform the following functions:

cause the multiple port charger to charge one or more of the batteries through its associated charging port, store information in the memory relating to batteries received by, and provided, to the customers, and output information relating to an amount due from a customer receiving a recharged battery.

2. The apparatus of claim 1, further including an interface connected to the controller configured for communication with an electronic cash register.

3. The apparatus of claim 1, configured the controller being further operative to:

receive condition information relating to a battery through the means for making electrical contact to the terminals of the battery, and output information relating to an amount due from a customer, taking into account the condition information relating to a battery supplied by that customer.

4. The apparatus of claim 3, the controller being further operative to cause the multiple port charger to recharge a particular battery using an algorithm chosen according to the results of an electrical test performed upon the battery.

5. The apparatus of claim 1, the controller and multiple port charger being further operative to charge multiple batteries, each at a different port, using a time-multiplexed recharging process.

6. The apparatus of claim 1, further including an input to receive energy rate information, the controller being operative to cause the multiple port charger to charge a battery through its associated charging port in accordance with the rate information.

7. The apparatus of claim 1 configured for use with batteries having encoded identification information, the input to receive customer and battery-identification information including a decoder of the information.

8. The apparatus of claim 1, further including a communications interface, the controller being further operative to exchange the customer and battery-identification information with a remotely located center.

9. A rechargeable battery vending machine, comprising:

an enclosure;

a plurality of battery storage locations within the enclosure;

an access area on the enclosure including a window through which a user of the machine may deposit a discharged battery or receive a charged battery;

a battery handling mechanism within the enclosure operative to move a battery between the access area and a storage location;

an input to receive electrical power;

electrical battery contacting means to make electrical contact with a battery in a storage location;

a multiple port charger operative to route power from the input to at least one battery in storage through its associated electrical battery contacting means for the purpose of recharging the battery;

an operator input supported on the enclosure including payment receiving means;

a controller connected to the battery handling mechanism, the multiple port charger, and the operator input, the controller being operative to perform the following functions:

keep track of batteries in storage, cause a battery in a storage position to be recharged, and deliver a charged battery to a customer, including a battery different than that received from the customer, through the access area in accordance with a payment received.

10. The rechargeable battery vending machine of claim 9, the controller being further operative to accept a battery from a customer through the access area.

11. The rechargeable battery vending machine of claim 10, the controller being further operative to perform an electrical test upon a battery received from a customer through the electrical battery contacting means and condition acceptance of the battery based upon the results of the test.

12. The rechargeable battery vending machine of claim 10, the controller being further operative in conjunction with the multiple port charger to recharge a particular battery using an algorithm chosen according to the results of an electrical test performed upon the battery.

13. The rechargeable battery vending machine of claim 9, the controller being further operative to credit a customer through the payment receiving means in accordance with energy remaining on a battery received from the customer.

14. The rechargeable battery vending machine of claim 9, further including a communications interface, the controller being further operative to exchange customer or battery related information with a remotely located center.

15. The rechargeable battery vending machine of claim 9, the operator control area including a display, the controller being further operative to cause the display of energy rates associated with electrical power available through the input.

16. The rechargeable battery vending machine of claim 9, the controller being further operative delay the recharging of a battery so as to take advantage of a lower energy rate.

17. The rechargeable battery vending machine of claim 9, the controller being further operative to provide a warning that few batteries are remaining in storage.

18. The rechargeable battery vending machine of claim 9, the multiple port charger being operative to recharge a plurality of batteries, each connected to one of the ports, by routing power to the batteries on a time-multiplexed basis.

19. The rechargeable battery vending machine of claim 9, adapted for use with batteries bearing identification encoding indicia, the machine further including a battery security encoder operative perceive and decode the identification indicia, the controller further being connected to the battery security encoder and accept a battery from a customer depending upon the decoded identification information.

20. The rechargeable battery vending machine of claim 9, the battery handling mechanism including a carousel including a plurality of storage locations, the controller being operative to rotate the carousel so as to align a storage location with the window.

21. The rechargeable battery vending machine of claim 9, the battery handling mechanism including:

at least one battery storage magazine; and a pick-and-place mechanism, the controller being further operative to cause a battery to be transferred between the window and a position within the magazine.

22. The rechargeable battery vending machine of claim 9, adapted for use with one or more predetermined battery types, the machine rejecting non-conforming batteries.

23. The rechargeable battery vending machine of claim 9, the controller being further operative to provide a customer with a set of replacement batteries exhibiting compatible electrical characteristics.

24. The rechargeable battery vending apparatus of claim 23, further including a communications interface, the controller being further operative to exchange historical battery-related information with a remotely located center and use the information to provide a customer with a set of batteries having compatible electrical characteristics.

25. A rechargeable battery vending apparatus adapted for use in conjunction with batteries encoding identification information, the apparatus being connectable to a source of electrical energy and further connectable to a remote monitoring facility through a communications path, the rechargeable battery vending apparatus comprising:

an enclosure including an access area through which a customer may deposit a discharged battery and receive a charged battery;

a customer control panel disposed on the enclosure, the panel including a display and means to receive a payment;

an input to receive power from the source of electrical energy;

a port for connection to the remote monitoring facility through the communications path;

a battery movement mechanism within the enclosure including a plurality of battery holding positions, each battery holding position including means for contacting to the electrical terminals of a battery held therein, the battery movement mechanism being operative to a bring a holding position into alignment with the access panel so that a customer may deposit a battery into a particular holding position or remove a battery therefrom;

a multiple-port charger adapted to receive power from the electrical input and selectively route the power to a battery in a holding position through the battery contacting means associated with that position;

a battery security encoder including an interface operative to receive battery-related information from a battery contained within a battery holding position; and an operations controller connected to the customer control panel, the battery movement mechanism, the multiple-port charger and the battery security encoder, the controller being operative to perform the following functions:

(a) receive customer-related information through the customer control panel, (b) receive battery chargeability information through battery contacting means associated with the multiple-port charger, (c) receive the battery-identification information from the battery security encoder, (d) cause the acceptance of a customer-supplied battery conditioned upon:
information relating to a customer,
battery chargeability, or
battery identification information, (e) cause movement of the battery movement mechanism in order to align a battery holding position with the access area, (f) cause the multiple-port charger to charge a battery in a holding position in accordance with a charging algorithm, and (g) communicate with the remote monitoring facility through the communications path.

* * * * *